Nov. 22, 1960   G. A. JELLEY   2,961,517
THERMAL OVERLOAD PROTECTION DEVICES FOR MOTOR STARTING SWITCHES
Filed Sept. 9, 1958   4 Sheets-Sheet 1

Inventor
Gordon Albert Jelley
By Tucker Lucke
Attorney

Nov. 22, 1960 G. A. JELLEY 2,961,517
THERMAL OVERLOAD PROTECTION DEVICES FOR MOTOR STARTING SWITCHES
Filed Sept. 9, 1958 4 Sheets-Sheet 3

Inventor
Gordon Albert Jelley
By
Attorney

Nov. 22, 1960 G. A. JELLEY 2,961,517
THERMAL OVERLOAD PROTECTION DEVICES FOR MOTOR STARTING SWITCHES
Filed Sept. 9, 1958 4 Sheets-Sheet 4

Inventor
Gordon Albert Jelley
By
Attorney

United States Patent Office 2,961,517
Patented Nov. 22, 1960

2,961,517

THERMAL OVERLOAD PROTECTION DEVICES FOR MOTOR STARTING SWITCHES

Gordon Albert Jelley, Walsall, England, assignor to J. A. Crabtree & Co. Limited, Walsall, England, a British company Filed Sept. 9, 1958, Ser. No. 759,968

Claims priority, application Great Britain Sept. 16, 1957

9 Claims. (Cl. 200—122)

This invention relates to improvements in thermal overload protection devices for motor starting switches and is particularly concerned with replaceable heaters for the bimetal elements of such devices, the object being to provide an highly efficient arrangement of simple construction.

According to this invention the heater may comprise a pair of elements adapted to be disposed on each side of a bimetal member, respective ends of the elements being secured to a pair of connectors between which may be mounted either a rating label or, a shunt. The bimetals for the respective phases may be mounted on a common insulating plate, each bimetal being pivotally mounted, between its ends, on a pin adjustably mounted on the plate. Each connector is formed with narrow arms for its connection to the ends of the heaters. The heaters may be introduced from the front of the box and the insulating plate carrying the bimetals may be mounted at the rear, a cover over this plate providing a double wall for enhancing heat retention. Hollow walls may also be provided between the respective phases.

The disposition of heater strips on each side of the flat bimetal provide a highly efficient heating of the latter and the provision of narrow arms between the ends of each strip and its connector provides a temperature gradient to the terminals so that a high operating temperature with a desirably low terminal temperature are ensured.

In order to enable the invention to be readily understood reference will now be made to the accompanying drawings illustrating by way of example an overload box for a three-phase motor starting switch, in which drawings.

Figure 1:
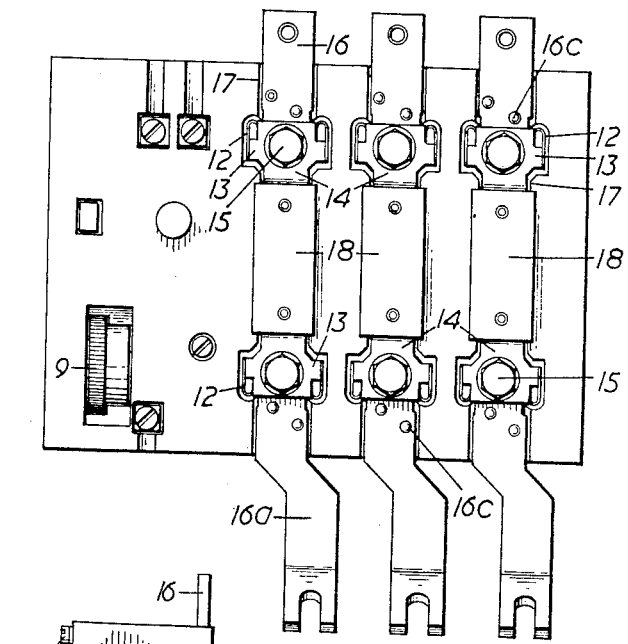
Figure 1 is a front elevation.
Figure 2:
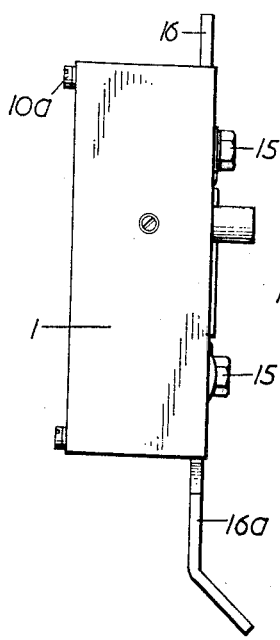
Figure 2 is a side elevation of Figure 1.
Figure 3:
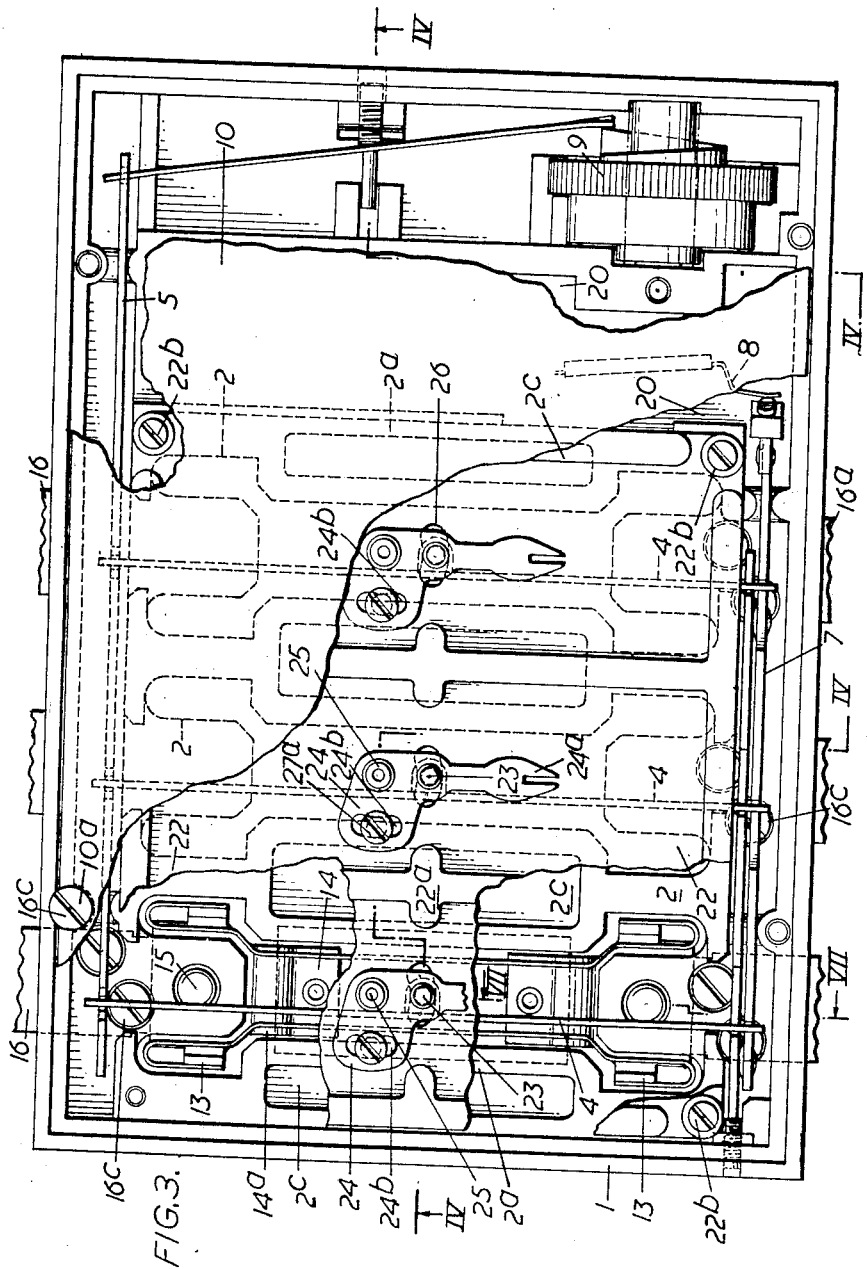
Figure 3 is a rear elevation to a larger scale with parts of the co-ordinating bar shown in section, and portions of the rear cover and of the mounting plate for the bimetals, removed.
Figure 4:
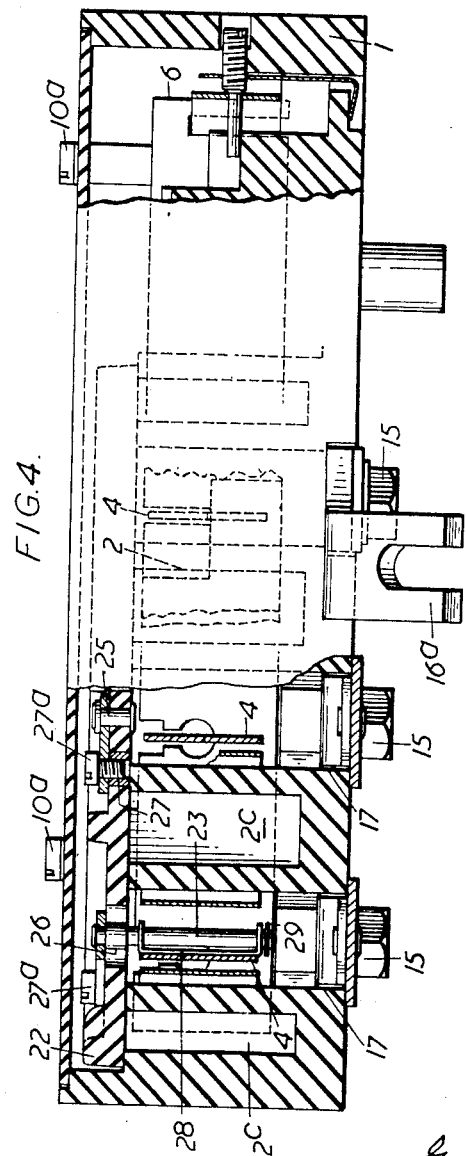
Figure 4 is a section on the line IV—IV of Figure 3.
Figure 5:
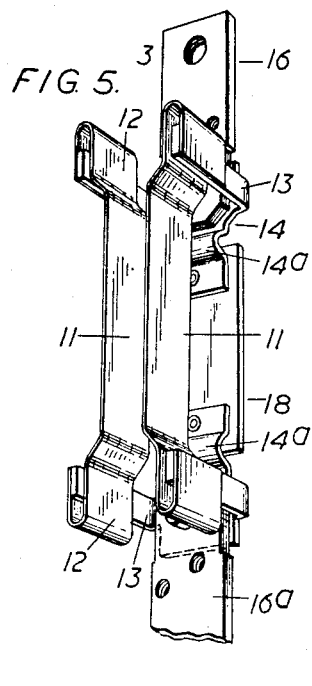
Figure 5 is a perspective view of a heater unit.
Figure 6:
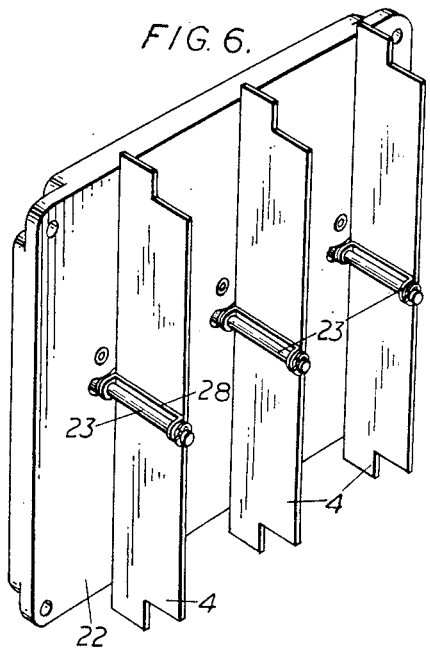
Figure 6 is a perspective view of the bimetal and other mountings.
Figure 7:
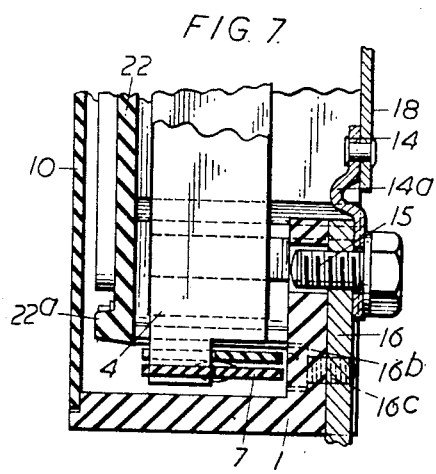
Figure 7 is a section on the line VII—VII of Figure 3.

Referring to the drawings the overload box comprises a casing 1, moulded from insulated material and formed with vertical partitions 2 in the compartments between which are removably mounted heater units 3, Figure 5, for the three bimetal elements 4. The latter act at their upper ends on a co-ordinating bar 5 engageable with an ambient compensating blade 6, and at their lower ends with a trip bar 7 which actuates a trip mechanism 8. The latter and the ambient blade 6, together with adjustment mechanism 9 for the latter, are housed in an end compartment 20 of the casing. The ambient adjustment mechanism is similar to that described and claimed in our U.S. Patent No. 2,606,062. The open back of the casing is closed by a flat cover 10, secured to the casing by screws 10ª.

Each heater comprises flat parallelly disposed spaced strips 11 having their ends bent outwardly so as to be spaced more widely and to form loops 12. The extremities of the loops at each end are welded to narrow arms 13 bent at right angles from each side of a flat connector plate or terminals 14 apertured for the passage of a screw 15. The screws clamp the plate 14 to metal straps 16, 16ª, when the device is introduced into an opening 17 in the front of the overload box with the heater strips 11 disposed on each side of a flat bimetal strip 4. This opening 17 is of the minimum size to permit introduction of the heater in order to reduce heat losses from the overload box. The straps 16, 16ª, which are tapped for reception of the screws, are secured to inwardly extending projections 16ᵇ on the front of the casing, by means of screws 16ᶜ.

The inner ends of the connector plates 14 have riveted thereto a rectangular sheet 18 of insulating material which may receive rating legends and so on. Such ends are formed with a corrugation 14ª for preventing twisting of the heater. The ends of such corrugation abut against the side walls of the aperture 17 which is of the minimum size to admit the heater, and the insulating sheet 18 covers the greater part of the opening, in order to reduce heat losses.

One side of the chamber 20 is closed by a partition 2ª while a similarly shaped member is formed on the end wall of the casing remote from the trip. The partitions 2 and the members 2ª are formed with enlarged hollow spaces which constitute still air spaces 2ᶜ for the purpose of minimising heat conductivity.

The bimetals 4 are mounted on an insulating plate 22 formed with ribs 22ª on its rear surface and which can be removed from the overload box as a unit in order to facilitate access for inspection of a bimetal if required. Access to other parts may be achieved without necessitating disturbance of individual bimetals or their settings. The plate is secured to the casing by corner screws 22ᵇ. Each flat bimetal member is pivotally mounted between its ends on a pin 23 carried on a small plate or lug 24 which is pivotally mounted on a rivet 25 secured to the insulating plate 22. The pin 23 extends through a short arcuate slot 26 in the insulating plate so that it can be adjusted therein around the pivot 25. The pin is secured in its position of adjustment by means of a screw 27ª extending through a short arcuate slot 24ᵇ in the plate 24 into engagement with a recessed nut 27 in the insulating plate 22. The plate 24 is formed with a slotted pointer or finger 24ª for facilitating adjustment when the securing screw 27ª is loosened. The pin 23 extends through aligning holes in the bent ends of a flat strip 28 welded to one face of the bimetal between its ends to form a retaining bracket. The end of the pin remote from the adjustment may be grooved and engaged by a C-shaped clip 29, for retaining the bracket with the bimetal in position on the pin. The ends of the bimetal are of reduced width and these reduced ends are engageable with the trip bar and co-ordinating bar for obtaining, in known manner, a differential action, so that whilst preserving an inverse time characteristic in the event of balanced overloads, an accelerated time of release is obtained in the event of unbalanced overloads, as occurs for example in the windings of a three-phase motor when the supply of one phase is interrupted. The cold bimetals will abut against formations 1ª on the casing. Alternatively these abutments may be provided by slots in a bar disposed parallel to the trip bar 7 and which is longitudinally adjustable, to give the accelerated tripping on differential action.

Figure 8:
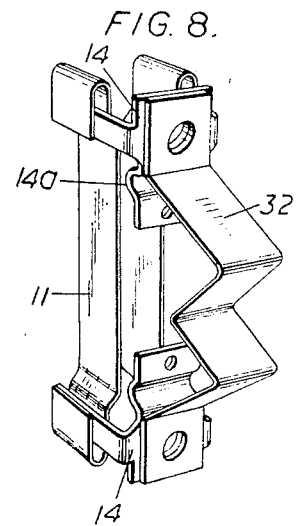
Figure 8 is a perspective view of a shunt employed in conjunction with a heater.

According to the modified construction shown in Figure 8, the rating label 18 is omitted and a shunt 32 is secured at each end to a connector plate 14.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

Having thus described my invention, I claim:

1. A thermal overload protection device for a motor starting switch comprising an insulating plate, a flat bimetal member pivotally mounted between its ends to said plate, slidable insulating bars engageable by each end of said member, and a replaceable heater, said heater comprising a pair of elements, one of said elements disposed on each side of said member.

2. A thermal overload protection device for a multiphase motor starting switch comprising an overload box having openings therein, a plurality of bimetal members for respective phases of said motor, a common insulating plate for said members, an adjustably mounted pin for pivotally mounting each of said members between its respective ends to said plate, a replaceable heater insertible through said openings into close relationship with each of said members, said openings being of reduced size to minimise thermal losses from said heater.

3. A device according to claim 2 having a small plate carrying said pin thereon, said small plate being secured in adjustable position to said insulating plate by a screw and slot engagement.

4. A device according to claim 2 wherein said heater comprises a connector plate, narrow bent arms extending from said connector plate, parallelly disposed strips having the ends thereof bent outwardly to form widely spaced loops, the extremities of each loop being welded to one of said arms, said connector plate being adapted to mount a rating label thereon.

5. A thermal overload protection device for a motor starting switch comprising a connector plate having narrow arms extending therefrom, a bimetal member, and a replaceable heater, said heater comprising a pair of flat parallelly disposed strips adapted to be disposed on each side of said member, a pair of connector straps, the respective ends of said strips secured to said straps, said ends being bent outwardly to form widely spaced loops, the extremities of each loop being welded to one of said arms, and said connector plate being adapted to mount a shunt thereon.

6. A device according to claim 2 wherein said pin is secured to a carrier plate, a pivot disposed on said insulating plate for adjustably mounting said carrier plate and said pin.

7. A device according to claim 6 in which a flat strip with bent-over ends is welded to one face of said member and said pin extends through aligned holes in said bent-over ends.

8. A thermal protection device for a motor starting switch, comprising a box, an insulating plate disposed on said box, a plurality of bimetal members disposed on said plate, a heater provided for each of said members, said heaters each comprising two elements, one of said elements being disposed on each side of its complementary bimetal member and each heater being individually removable from said box independently of its said complementary bimetal member.

9. A thermal overload protection device for a motor starting switch comprising an insulating plate, a plurality of flat bimetal members each pivotally mounted between its ends on said plate, and a heater for each of said members, each of said heaters being individually removable from said box independently of its complementary bimetal member, said heaters each comprising a pair of parallel elements, one of said elements being disposed on each side of a bimetal member.

References Cited in the file of this patent

UNITED STATES PATENTS

| 1,910,494 | O'Keeffe | May 23, 1933 |
| 2,199,477 | Besag | May 7, 1940 |
| 2,749,407 | Walton et al. | June 5, 1956 |
| 2,908,786 | Schleicher | Oct. 13, 1959 |

FOREIGN PATENTS

| 628,220 | Great Britain | Aug. 24, 1949 |